United States Patent Office 3,300,471
Patented Jan. 24, 1967

---

3,300,471
p-(N-CYANOALKYL-N-HYDROCARBYLAMINO)-BENZENEDIAZONIUM CHLORIDES
Joseph T. Arrigo, Mount Prospect, Ill., assignor to Universal Oil Products Company, Des Plaines, Ill., a corporation of Delaware
No Drawing. Filed Jan. 2, 1964, Ser. No. 335,384
10 Claims. (Cl. 260—142)

This invention relates to a novel composition of matter comprising a benzenediazonium compound having a cyanoalkylamino configuration attached in a position para to the diazonium radical.

The novel compounds of the present invention may be illustrated by the following formula:

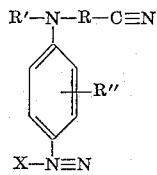

where R is an alkylene radical containing from 1 to 10 carbon atoms, R' and R'' are independently selected from the group consisting of hydrogen and organo substituents and X is inorganic anion.

In one embodiment R' comprises an organo substituent selected from the group consisting of alkyl, cycloalkyl, alkenyl, cycloalkenyl, aralkyl, aralkenyl, aryl, acyl, hydroxyalkyl, alkoxyalkyl, carboxyalkyl, tetrahydrofurfuryl and cyanoalkyl radicals. In one embodiment R'' comprises one or more of an organo substituent selected from those specifically set forth for the R' substituent or selected from carboxyl, halogen, nitro, alkoxyl, alkenoxyl, aryloxyl, acyloxyl and alkylmercapto radicals. In a preferred embodiment X is a halide and preferably comprises chloride, although it may comprise bromide, fluoride or iodide. In another embodiment X comprises sulfate, phosphate, fluoborate or other suitable inorganic anion.

Preferred compounds of the present invention comprise p-(N-cyanoalkyl-N-hydrocarbylamino)-benzenediazonium chlorides in which the hydrocarbyl group, when alkyl, contains from 1 to 20 carbon atoms and more particularly from 3 to 10 carbon atoms and, when cycloalkyl, contains from 4 to 20 and preferably from 6 to 10 carbon atoms. While in this embodiment R' may be methyl or ethyl, it is particularly preferred that R' is of secondary configuration, including both alkyl and cycloalkyl radicals. Illustrative preferred compounds comprise p-(N-β-cyanoethyl-N-isopropylamino)-benzenediazonium chloride, p-(N-β-cyanoethyl-N-sec-butylamino)-benzenediazonium chloride, p-(N-β-cyanoethyl-N-sec-pentylamino)-benzenediazonium chloride, p-(N-β-cyanoethyl-N-sec-hexylamino)-benzenediazonium chloride, p-(N-β-cyanoethyl-N-sec-heptylamino)-benzenediazonium chloride, p-(N-β-cyanoethyl-N-sec-octylamino)-benzenediazonium chloride, p-(N-β-cyanoethyl-N-sec-nonylamino)-benzenediazonium chloride, p-(N-β-cyanoethyl-N-sec-decylamino)-benzenediazonium chloride, p-(N-β-cyanoethyl-N-cyclohexylamino)-benzenediazonium chloride, etc., similarly substituted compounds in which the cyanoethyl radical is replaced by cyanomethyl, cyanopropyl, cyanobutyl, cyanopentyl, cyanohexyl, etc., similarly substituted compounds in which the sec-alkyl radical contains up to 20 or more carbon atoms, similarly substituted compounds in which the cyclohexyl radical is replaced by cyclobutyl, cyclopentyl, cycloheptyl, cyclooctyl, cyclononyl, cyclodecyl, etc., and similarly substituted compounds in which the chloride is replaced by bromide, fluoride or iodide.

In still another preferred embodiment, R' is of tertiary-alkyl configuration. Illustrative compounds include p-(N-β-cyanoethyl-N-t-butylamino)-benzenediazonium chloride, p-(N-β-cyanoethyl-N-t-pentylamino)-benzenediazonium chloride, p-(N-β-cyanoethyl-N-t-hexylamino)-benzenediazonium chloride, p-(N-β-cyanoethyl-N-t-heptylamino)-benzenediazonium chloride, p-(N-β-cyanoethyl-N-t-octylamino)-benzenediazonium chloride, p-(N-β-cyanoethyl-N-t-nonylamino)-benzenediazonium chloride, p-(N-β-cyanoethyl-N-t-decylamino)-benzenediazonium chloride, etc., similarly substituted compounds in which the t-alkyl radical contains up to 20 or more carbon atoms, similarly substituted compounds in which the cyanoethyl is replaced by cyanomethyl, cyanopropyl, cyanobutyl, cyanopentyl, cyanohexyl, etc., and similarly substituted compounds in which the chloride is replaced by another halogen.

In still another preferred embodiment R' comprises a hydroxyalkyl radical in which the hydroxyalkyl moiety contains from 1 to 20 carbon atoms and preferably from 1 to 5 carbon atoms. A particularly preferred compound in this embodiment comprises p-(N-β-cyanoethyl-N-β-hydroxyethylamino)-benzenediazonium chloride. It is understood that this embodiment includes similarly substituted compounds in which the cyanoalkyl and/or hydroxyalkyl radicals contain from 1 to 10 or more carbon atoms each, and in which the chloride is replaced by another halide. In still another embodiment preferred compounds include those in which R' comprises a cyanoalkyl radical. A particularly preferred compound in this embodiment comprises p-(N,N-di-β-cyanoethylamino)-benzenediazonium chloride. Here again, it is understood that the cyanoalkyl radicals may contain from 1 to 10 or more carbon atoms each and that the chloride may comprise another halide.

Referring to the above formula, in a preferred embodiment R'' comprises one or more of electron-donating or electron-withdrawing substituents in the proper position to serve to increase the sensitivity of the diazo compound to ultraviolet light. Any suitable electron-donating and electron-withdrawing group or groups may be employed. The electron-donating group preferably is in the 3-position (i.e., in a meta-position to the diazonium group). In one embodiment the electron-donating substituent is an oxygen-containing group and more particularly hydroxy and/or alkoxy including methoxy, ethoxy, propoxy and butoxy, although the alkoxy group may contain a larger number of carbon atoms and thus may range up to decyloxy. The alkoxy group may contain a hydroxy substituent to further improve the properties and particularly water solubility. In another embodiment the electron-donating group is a hydrocarbon substituent and preferably an alkyl group selected from methyl, ethyl, propyl, butyl, pentyl and hexyl, although a higher molecular weight alkyl group may be employed which usually will not contain more than about 12 carbon atoms.

The electron-withdrawing group preferably is in the 2-position (i.e., in an ortho-position to the diazonium group) and, in one embodiment, comprises a halogen and preferably chlorine. Other halogens comprise bromine, iodine and/or fluorine.

Illustrative examples of other p-(N-cyanoalkyl-N-organoamino)-benzenediazonium chlorides include p-(N-β-cyanoethyl-N-allylamino)-benzenediazonium chloride,
p-(N-β-cyanoethyl-N-propenylamino)-benzenediazonium chloride,
p-(N-β-cyanoethyl-N-butenylamino)-benzenediazonium chloride,
p-(N-β-cyanoethyl-N-pentenylamino)-benzenediazonium chloride, etc., p-(N-β-cyanoethyl-N-cyclopentenylamino)-benzenediazonium chloride,
p-(N-β-cyanoethyl-N-cyclohexenylamino)-benzenediazonium chloride,
p-(N-β-cyanoethyl-N-cycloheptenylamino)-benzenediazonium chloride,
p-(N-β-cyanoethyl-N-cyclooctenylamino)-benzenediazonium chloride, etc.,
p-(N-β-cyanoethyl-N-benzylamino)-benzenediazonium chloride,
p-(N-β-cyanoethyl-N-β-phenethylamino)-benzenediazonium chloride,
p-(N-β-cyanoethyl-N-α-phenethylamino)-benzenediazonium chloride,
p-(N-β-cyanoethyl-N-phenpropylamino)-benzenediazonium chloride,
p-(N-β-cyanoethyl-N-phenbutylamino)-benzenediazonium chloride, etc.,
p-(N-β-cyanoethyl-N-β-styrylamino)-benzenediazonium chloride,
p-(N-β-cyanoethyl-N-β-methyl-β-styrylamino)-benzenediazonium chloride, etc.,
p-(N-β-cyanoethyl-N-α-phenallylamino)-benzenediazonium chloride,
p-(N-β-cyanoethyl-N-phenylamino)-benzenediazonium chloride,
p-(N-β-cyanoethyl-N-α-naphthylamino)-benzenediazonium chloride,
p-(N-β-cyanoethyl-N-β-naphthylamino)-benzenediazonium chloride, etc.
p-(N-β-cyanoethyl-N-acetylamino)-benzenediazonium chloride,
p-(N-β-cyanoethyl-N-propionylamino)-benzenediazonium chloride,
p(N-β-cyanoethyl-N-butyrylamino)-benzenediazonium chloride,
p-(N-β-cyanoethyl-N-benzoylamino)-benzenediazonium chloride, etc.
p-(N-β-cyanoethyl-N-methoxymethylamino)-benzenediazonium chloride,
p-(N-β-cyanoethyl-N-methoxyethylamino)-benzenediazonium chloride,
p-(N-β-cyanoethyl-N-ethoxymethylamino)-benzenediazonium chloride,
p-(N-β-cyanoethyl-N-ethoxyethylamino)-benzenediazonium chloride,
p-(N-β-cyanoethyl-N-propoxymethylamino)-benzenediazonium chloride,
p-(N-β-cyanoethyl-N-propoxyethylamino)-benzenediazonium chloride,
p-(N-β-cyanoethyl-N-butoxymethylamino)-benzenediazonium chloride,
p-(N-β-cyanoethyl-N-butoxyethylamino)-benzenediazonium chloride, etc.,
p-(N-β-cyanoethyl-N-carboxymethylamino)-benzenediazonium chloride,
p-(N-β-cyanoethyl-N-carboxyethylamino)-benzenediazonium chloride,
p-(N-β-cyanoethyl-N-carboxypropylamino)-benzenediazonium chloride,
p-(N-β-cyanoethyl-N-carboxybutylamino)-benzenediazonium chloride, etc.
p-N-β-cyanoethyl-N-β-tetrahydrofurfurylamino)-benzenediazonium chloride,
p-(N-β-cyanoethyl-N-α-tetrahydrofurfurylamino)-benzenediazonium chloride, similarly substituted compounds in which the cyanoethyl radical is replaced by cyanomethyl, cyanopropyl, cyanobutyl, cyanopentyl, cyanohexyl, etc., and similarly substituted compounds in which the chloride is replaced by bromide, fluoride or iodide.

Illustrative example of compounds containing substituents on the benzene nucleus include p-(N-β-cyanoethyl-N-isopropylamino)-3-methylbenzenediazonium chloride,
p-(N-β-cyanoethyl-N-isopropylamino)-3-ethylbenzenediazonium chloride,
p-(N-β-cyanoethyl-N-isopropylamino)-3-propylbenzenediazonium chloride,
p-(N-β-cyanoethyl-N-isopropylamino)-3-butylbenzenediazonium chloride, etc.,
p-(N-β-cyanoethyl-N-isopropylamino)-3-cyclopentylbenzenediazonium chloride,
p-(N-β-cyanoethyl-N-isopropylamino)-3-cyclohexylbenzenediazonium chloride,
p-(N-β-cyanoethyl-N-isopropylamino)-3-cycloheptylbenzenediazonium chloride,
p-(N-β-cyanoethyl-N-isopropylamino)-3-cyclooctylbenzenediazonium chloride, etc.,
p-(N-β-cyanoethyl-N-isopropylamino)-3-allylbenzenediazonium chloride,
p-(N-β-cyanoethyl-N-isopropylamino)-3-propenylbenzenediazonium chloride,
p-(N-β-cyanoethyl-N-isopropylamino)-3-butenylbenzenediazonium chloride,
p-(N-β-cyanoethyl-N-isopropylamino)-3-cyclopentenylbenzenediazonium chloride,
p-(N-β-cyanoethyl-N-isopropylamino)-3-cyclohexenylbenzenediazonium chloride,
p-(N-β-cyanoethyl-N-isopropylamino)-3-cycloheptenylbenzenediazonium chloride,
p-(N-β-cyanoethyl-N-isopropylamino)-3-cyclooctenylbenzenediazonium chloride, etc.
p-(N-β-cyanoethyl-N-isopropylamino)-3-benzylbenzenediazonium chloride,
p-(N-β-cyanoethyl-N-isopropylamino)-3-phenethylbenzenediazonium chloride,
p-(N-β-cyanoethyl-N-isopropylamino)-3-phenpropylbenzenediazonium chloride,
p-(N-β-cyanoethyl-N-isopropylamino)-3-phenbutylbenzenediazonium chloride, etc.,
p-(N-β-cyanoethyl-N-isopropylamino)-3-α-styrylbenzenediazonium chloride,
p-(N-β-cyanoethyl-N-isopropylamino)-3-β-styrylbenzenediazonium chloride, etc.,
p-(N-β-cyanoethyl-N-isopropylamino)-3-phenylbenzenediazonium chloride,
p-(N-β-cyanoethyl-N-isopropylamino)-3-α-naphthylbenzenediazonium chloride,
p-(N-β-cyanoethyl-N-isopropylamino)-3-β-naphthylbenzenediazonium chloride, etc.
p-(N-β-cyanoethyl-N-isopropylamino)-3-β-hydroxyethylbenzenediazonium chloride,
p-(N-β-cyanoethyl-N-isopropylamino)-3-hydroxypropylbenzenediazonium chloride,
p-(N-β-cyanoethyl-N-isopropylamino)-3-hydroxybutylbenzenediazonium chloride, etc.,
p-(N-β-cyanoethyl-N-isopropylamino)-3-methoxymethylbenzenediazonium chloride,
p-(N-β-cyanoethyl-N-isopropylamino)-3-methoxyethylbenzenediazonium chloride,
p-(N-β-cyanoethyl-N-isopropylamino)-3-ethoxymethylbenzenediazonium chloride,
p-(N-β-cyanoethyl-N-isopropylamino)-3-ethoxyethylbenzenediazonium chloride,
p-(N-β-cyanoethyl-N-isopropylamino)-3-propoxymethylbenzenediazonium chloride,
p-(N-β-cyanoethyl-N-isopropylamino)-3-propoxyethylbenzenediazonium chloride,
p-(N-β-cyanoethyl-N-isopropylamino)-3-butoxymethylbenzenediazonium chloride,
p-(N-β-cyanoethyl-N-isopropylamino)-3-butoxyethylbenzenediazonium chloride, etc.,
p-(N-β-cyanoethyl-N-isopropylamino)-3-carboxymethylbenzenediazonium chloride,
p-(N-β-cyanoethyl-N-isopropylamino)-3-carboxyethylbenzenediazonium chloride,
p-(N-β-cyanoethyl-N-isopropylamino)-3-carboxypropylbenzenediazonium chloride, p-(N-β-cyanoethyl-N-isopropylamino)-3-carboxybutyl-benzenediazonium chloride, etc.
p-(N-β-cyanoethyl-N-isopropylamino)-3-α-tetrahydrofurfurylbenzenediazonium chloride,
p-(N-β-cyanoethyl-N-isopropylamino)-3-β-tetrahydrofurfurylbenzenediazonium chloride, etc.,
p-(N-β-cyanoethyl-N-isopropylamino)-3-cyanomethylbenzenediazonium chloride,
p-(N-β-cyanoethyl-N-isopropylamino)-3-cyanoethylbenzenediazonium chloride,
p-(N-β-cyanoethyl-N-isopropylamino)-3-cyanopropylbenzenediazonium chloride,
p-(N-β-cyanoethyl-N-isopropylamino)-3-cyanobutylbenzenediazonium chloride, etc.,
p-(N-β-cyanoethyl-N-isopropylamino)-3-methoxylbenzenediazonium chloride,
p-(N-β-cyanoethyl-N-isopropylamino)-3-ethoxylbenzenediazonium chloride,
p-(N-β-cyanoethyl-N-isopropylamino)-3-propoxylbenzenediazonium chloride,
p-(N-β-cyanoethyl-N-isopropylamino)-3-butoxylbenzenediazonium chloride, etc.,
p-(N-β-cyanoethyl-N-isopropylamino)-3-allyloxylbenzenediazonium chloride,
p-(N-β-cyanoethyl-N-isopropylamino)-3-propenyloxylbenzenediazonium chloride,
p-(N-β-cyanoethyl-N-isopropylamino)-3-butenyloxylbenzenediazonium chloride, etc.,
p-(N-β-cyanoethyl-N-isopropylamino)-3-phenoxylbenzenediazonium chloride,
p-(N-β-cyanoethyl-N-isopropylamino)-3-naphthyloxylbenzenediazonium chloride, etc.,
p-(N-β-cyanoethyl-N-isopropylamino)-3-acetyloxylbenzenediazonium chloride,
p-(N-β-cyanoethyl-N-isopropylamino)-3-propionyloxylbenzenediazonium chlorida,
p-(N-β-cyanoethyl-N-isopropylamino)-3-butyryloxylbenzenediazonium chloride, etc.,
p-(N-β-cyanoethyl-N-isopropylamino)-3-methylmercaptobenzenediazonium chloride,
p-(N-β-cyanoethyl-N-isopropylamino)-3-ethylmercaptobenzenediazonium chloride,
p-(N-β-cyanoethyl-N-isopropylamino)-3-propylmercaptobenzenediazonium chloride,
p-(N-β-cyanoethyl-N-isopropylamino)-3-butylmercaptobenzenediazonium chloride, etc.,
p-(N-β-cyanoethyl-N-isopropylamino)-2-acetylbenzenediazonium chloride,
p-(N-β-cyanoethyl-N-isopropylamino)-2-propionylbenzenediazonium chloride,
p-(N-β-cyanoethyl-N-isopropylamino)-2-butyrylbenzenediazonium chloride, etc.,
p-(N-β-cyanoethyl-N-isopropylamino)-2-carboxylbenzenediazonium chloride,
p-(N-β-cyanoethyl-N-isopropylamino)-2-chlorobenzenediazonium chloride,
p-(N-β-cyanoethyl-N-isopropylamino)-2-bromobenzenediazonium chloride,
p-(N-β-cyanoethyl-N-isopropylamino)-2-fluorobenzenediazonium chloride,
p-(N-β-cyanoethyl-N-isopropylamino)-2-iodobenzenediazonium chloride,
p-(N-β-cyanoethyl-N-isopropylamino)-2-nitrobenzenediazonium chloride, etc.,
p-(N-β-cyanoethyl-N-isopropylamino)-2-chloro-5-methoxybenzenediazonium chloride,
p-(N-β-cyanoethyl-N-isopropylamino)-2-chloro-5-ethoxybenzenediazonium chloride,
p-(N-β-cyanoethyl-N-isopropylamino)-2-chloro-5-propoxybenzenediazonium chloride,
p-(N-β-cyanoethyl-N-isopropylamino)-2-chloro-5-butoxybenzenediazonium chloride, etc.,
p-(N-β-cyanoethyl-N-isopropylamino)-2-acetyl-5-methoxybenzenediazonium chloride,
p-(N-β-cyanoethyl-N-isopropylamino)-2-propionyl-5-methoxybenzenediazonium chloride,
p-(N-β-cyanoethyl-N-isopropylamino)-2-butyryl-5-methoxybenzenediazonium chloride, etc.
p-(N-β-cyanoethyl-N-isopropylamino)-2-acetyl-5-ethoxybenzenediazonium chloride,
p-(N-β-cyanoethyl-N-isopropylamino)-2-acetyl-5-propoxybenzenediazonium chloride,
p-(N-β-cyanoethyl-N-isopropylamino)-2-acetyl-5-butoxybenzenediazonium chloride, etc.,
p-(N-β-cyanoethyl-N-isopropylamino)-2,5-dimethoxybenzenediazonium chloride,
p-(N-β-cyanoethyl-N-isopropylamino)-2,5-diethoxybenzenediazonium chloride,
p-(N-β-cyanoethyl-N-isopropylamino)-2,5-dipropoxybenzenediazonium chloride,
p-(N-β-cyanoethyl-N-isopropylamino)-2,5-dibutoxybenzenediazonium chloride etc.,
p-(N-β-cyanoethyl-N-isopropylamino)-2-methyl-5-methoxybenzenediazonium chloride,
p-(N-β-cyanoethyl-N-isopropylamino)-2-methyl-5-ethoxybenzenediazonium chloride,
p-(N-β-cyanoethyl-N-isopropylamino)-2-methyl-5-propoxybenzenediazonium chloride,
p-(N-β-cyanoethyl-N-isopropylamino)-2-methyl-5-butoxybenzenediazonium chloride,
p-(N-β-cyanoethyl-N-isopropylamino)-2-ethyl-5-methoxybenzenediazonium chloride,
p-(N-β-cyanoethyl-N-isopropylamino)-2-ethyl-5-ethoxybenzenediazonium chloride,
p-(N-β-cyanoethyl-N-isopropylamino)-2-ethyl-5-propoxybenzenediazonium chloride,
p-(N-β-cyanoethyl-N-isopropylamino)-2-ethyl-5-butoxybenzenediazonium chloride,
p-(N-β-cyanoethyl-N-isopropylamino)-2-methoxy-5-methylbenzenediazonium chloride,
p-(N-β-cyanoethyl-N-isopropylamino)-2-methoxy-5-ethylbenzenediazonium chloride,
p-(N-β-cyanoethyl-N-isopropylamino)-2-methoxy-5-propylbenzenediazonium chloride,
p-(N-β-cyanoethyl-N-isopropylamino)-2-methoxy-5-butylbenzenediazonium chloride,
p-(N-β-cyanoethyl-N-isopropylamino)-2-ethoxy-5-methylbenzenediazonium chloride,
p-(N-β-cyanoethyl-N-isopropylamino)-2-ethoxy-5-ethylbenzenediazonium chloride,
p-(N-β-cyanoethyl-N-isopropylamino)-2-ethoxy-5-propylbenzenediazonium chloride,
p-(N-β-cyanoethyl-N-isopropylamino)-2-ethoxy-5-butylbenzenediazonium chloride, etc., similarly substituted compounds in which the cyanoethyl radical is replaced by a cyanoalkyl radical containing from 1 to 10 carbon atoms, similarly substituted compounds in which the isopropyl radical is replaced by an alkyl radical containing from 1 to 20 carbon atoms or a cycloalkyl radical containing from 4 to 20 carbon atoms and similarly substituted compounds in which the chloride is replaced by another halogen.

Illustrative compounds in which X in the above formula is other than a halogen include p-(N-β-cyanoethyl-N-isopropylamino)-benzenediazonium sulfate, p-(N-β-cyanoethyl - N-isopropylamino)-benzenediazonium phosphate, p - (N - β-cyanoethyl-N-isopropylamino)-benzenediazonium fluoborate, etc., and similar compounds in which the cyanoethyl radical is replaced by a cyanoalkyl group containing from 1 to 10 carbon atoms, similarly substituted compounds in which the isopropyl radical is replaced by an alkyl radical of from 1 to 20 carbon atoms or by a cycloalkyl radical of from 4 to 20 carbon atoms.

In a preferred embodiment, the p-(N-cyanoalkyl-N-organoamino)-benzenediazonium halide is used in association with a metal salt which improves the stability of the diazo compound. In a particularly preferred embodiment, the diazo compound comprises a salt with a metal halide including zinc chloride, cadmium chloride, tin chloride, etc., as well as the corresponding bromides, iodides and/or fluorides. Zinc chloride appears to offer particular advantages and accordingly especially preferred diazo compounds of the present invention include p-(N-β-cyanoethyl - N-isopropylamino)-benzenediazonium chloride zinc chloride salt, p-(N-β-cyanoethyl-N-sec-butylamino)-benzenediazonium chloride zinc chloride salt, p-(N-β-cyanoethyl-N-sec-pentylamino) - benzenediazonium chloride zinc chloride salt, p-(N-β-cyanoethyl-N-sec-hexylamino)-benzenediazonium chloride zinc chloride salt, p - (N-β-cyanoethyl-N-sec-heptylamino)-benzenediazonium chloride zinc chloride salt, p-(N-β-cyanoethyl-N-sec-octylamino)-benzenediazonium chloride zinc chloride salt, p - (N-β-cyanoethyl-N-cyclohexylamino)-benzenediazonium chloride zinc chloride salt, etc., similarly substituted compounds in which the cyanoethyl is replaced by a cyanoalkyl group containing from 1 to 20 carbon atoms, similarly substituted compounds in which the sec-alkyl radical is replaced by methyl, ethyl or a tertiary-alkyl group of 9 to 20 carbon atoms or a cycloalkyl radical of 4 to 20 carbon atoms, similarly substituted compounds in which the chloride is replaced by another halogen or other inorganic anions, and similarly substituted compounds in which the benzene ring contains electron-donating and/or electron-withdrawing substituents.

The specific compounds hereinbefore set forth comprise those of the preferred embodiments of the present invention. It is understood that p-(N-cyanoalkyl-N-organoamino) - benzenediazonium compounds containing the other substituents and/or metal salts as set forth hereinbefore are comprised within the scope of the present invention and are readily ascertainable from the present specifications.

The novel diazo compounds of the present invention are prepared in any suitable manner. When R' is a hydrocarbyl radical, N-hydrocarbylaniline preferably is first prepared and then is converted to N-cyanoalkyl-N-hydrocarbylaniline, which then is nitrosated, reduced and diazotized. For example, N-isopropylaniline is prepared by reductive alkylation of aniline with acetone. Similarly, N-sec-butylaniline is prepared by reductive alkylation of aniline with methyl ethyl ketone. Also, N-cyclohexylaniline is prepared by reductive alkylation of aniline with cyclohexanone. When the alkyl group is to be a primary alkyl group, an aldehyde is used in the reductive alkylation. The reductive alkylation is effected at a temperature within the range of from about 60° to about 250° C., more particularly from about 150° to about 180° C., and a hydrogen pressure within the range of from about 10 to 100 atmospheres or more in the presence of a reductive alkylation catalyst. Any suitable reductive alkylation catalyst is used and may comprise a composite containing platinum, palladium, nickel, cobalt molybdenum, etc., or mixtures thereof with a suitable carrier including alumina, silica, zirconia, titania, thoria, zinc oxide, or mixtures thereof.

The N-hydrocarbylaniline then is converted to the N-hydrocarbyl-N-cyanoalkylaniline in any suitable manner. In one general method this is effected by refluxing or otherwise heating and mixing the N-hydrocarbylaniline and a suitable nitrile in the absence or presence of an acidic or metal-salt catalyst. Illustrative catalysts include acetic acid, cupric acetate monohydrate without but preferably with acetic acid, copper sulfate pentahydrate, chromium trichloride hexahydrate, cuprous chloride, etc. The choice of catalyst will depend upon the particular reactants. The temperature generally will be within the range of from about 100° to about 180° C. or more and for a time ranging from 5 to 72 hours or more. For example, N-cyanoethyl-N-cyclohexylaniline is prepared by refluxing cyclohexylaniline and acrylonitrile in acetic acid at a temperature of about 115° C. for 50 hours. Other nitriles include methacrylonitrile, crotononitrile, chloroacetonitrile, chloropropionitrile, chlorobutyronitrile, chlorolauronitrile, chlorosteareonitrile, etc. When desired, aniline first may be reacted with the nitrile to form the N-cyanoalkylaniline which then may be reductively alkylated to form the N-cyanoalkyl-N-hydrocarbylaniline. When a tertiary-alkyl group is desired, it may be obtained by reacting aniline or N-cyanoalkylaniline with a tertiary-alkyl halide, particularly tertiary-alkyl iodide, at a temperature within the range of from about 0 to about 30° C. or more, followed by alkalinization.

When the diazo compound is an N,N-di-cyanoalkyl derivative, aniline is reacted with the nitrile in somewhat the same manner as hereinbefore set forth, but utilizing at least 2 mole proportions and preferably a large excess up to 10 mole proportions of the nitrile per 1 mole proportion of aniline and reacting under more severe conditions to obtain the N,N-di-cyanoalkylaniline. In another method, iminodipropionitrile is reacted with chlorobenzene or preferably p-chloronitrobenzene to form N,N-di-cyanoethylaniline or preferably N,N-di-cyanoethyl-p-nitroaniline.

When R' in the above formula is hydroxyalkyl, the precursor compounds may be prepared by a number of different methods. In one method, aniline is reacted with acrylonitrile, for example, to form N-(β-cyanoethyl)-aniline and then is reacted with alkylene oxide. For example, N-(β-cyanoethyl)-aniline is reacted with ethylene oxide to form N-(β-cyanoethyl)-N-β-hydroxyethylaniline. In another method, N-(β-cyanoethyl)-ethanolamine is reacted with chlorobenzene or preferably with p-nitrochlorobenzene. In still another method, aniline may be reacted with alkylene oxide to form the N-hydroxyalkylaniline, care being observed to control the oxyalkylation to limit the same to the monooxyalkylenated derivative, and then followed by reaction with a nitrile in the manner hereinbefore set forth.

The N-cyanoalkyl-N-organoaniline, prepared in the above manner, is converted into the corresponding diazonium compound in any suitable manner. In one method, the diazonium chloride is prepared by first forming the N-cyanoalkyl-N-organo-p-phenylenediamine and then converting this to the diazonium chloride. The N-cyanoalkyl-N-organo-p-phenylenediamine may be prepared by commingling the N-cyanoalkyl-N-organoaniline with hydrochloric acid at a temperature below about 10° C., which thus may range from −10° to 10° C. and preferably from about 0 to about 8° C. A nitrosating agent is added at this low temperature, preferably in increments, with intimate stirring. Sodium nitrite is a preferred nitrosating agent. Nitrous acid or nitrous acid precursors may be employed including, for example, organic nitrites as ethyl nitrite, propyl nitrite, butyl nitrite, pentyl nitrite, etc. A reducing agent then is added and the reaction is allowed to proceed at 40–50° C. Any suitable reducing agent is employed, zinc being particularly preferred. Other reducing agents include cadmium, tin, iron, etc., and, in fact, any metal above hydrogen in the Electromotive Series of Elements. The reactants are stirred at the desired temperature for a time sufficient to obtain complete reaction, which time may range from 0.5 to 24 hours or more. When the metal halide is not desired in the product, the reaction mixture is subjected to alkalinization and the resulting inorganic insoluble hydroxides are removed by filtration. The precipitate then is washed free of occluded amine with water and/or organic solvents such as methanol, ethanol, benzene, acetone, ether, etc. The amine is recovered from both the filtrate and the washing, either separately or preferably after combining these liquids, by phase separation, ether or benzene extraction (if necessary) and distillation. The resulting N-cyanoalkyl-N-organo-p-phenylenediamine is then converted to the diazonium chloride by further reaction with hydrochloric acid and sodium nitrite at the low temperature hereinbefore set forth. The p-(N-cyanoalkyl-N-organoamino)-benzenediazonium chloride is of limited stability and therefore should be protected from heat, light and air.

As hereinbefore set forth, another embodiment of the invention comprises the metal halide salt of the diazonium chloride. The metal halide salt is prepared in the same manner as described above except that zinc chloride or other metal halide is added to the reaction mixture, either by formation in situ or by addition in a later step in the process. For economic reasons, the metal used in the reduction step preferably is the same as that of the metal halide desired in the final product. For example, when the zinc chloride salt is desired, zinc is employed as the reducing agent. In this embodiment alkalinization of the reaction mixture is not required and any excess metal is removed by filtration. The final product is recovered in any suitable manner including one or more of salting out, crystallization, addition of a water-soluble solvent, such as acetone, in which the salt is insoluble, etc. The examples appended to the present specification describe various methods of preparing the novel compounds of the present invention.

The novel compounds of the present invention have various utility and are particularly suitable for use in the diazotype photoprinting process. In this process, a transparent or translucent original which is to be copied is placed in contact with paper or other material coated with a formulation containing a diazo compound and then exposed to light emission between the 360 A. and 4200 A. and, more particularly, between the 3000 A. and 4000 A. lines. Such rays effectively decompose the diazo component which they touch so that it can no longer combine with a coupling component to form a dye. Accordingly, when a diazotype layer is exposed to the source of light, the diazo compound decomposes to leave a colorless copy in those areas not protected by the opaque images on the transparent or translucent original. The diazo compound decomposes with the formation of nitrogen and colorless compounds, usually phenol. The diazo compound in the area beneath the opaque images of the original document, in a subsequent development step, reacts with a coupling agent and thereby produces a visible image on the copy.

For use in the diazo photoprinting process, the diazo compound of the present invention is employed in any suitable formulation. As hereinbefore set forth, a diazo coupling agent is required in the process. The coupling agent has been broadly defined in the literature as a substance which bears an active or mobile hydrogen atom. Coupling agents include hydroxy derivatives of benzene such as resorcinol and phloroglucinol or of naphthalene such as alpha- and beta-naphthols, their sulfonic acids and other substituted naphthols. Acetylacetone pyrazolones and other ketomethylene compounds also are used. Other constituents of the formulation depend upon the particular diazotype photoprinting process used and may include acids, wetting agents, pigments, binders, and one or more agents for protection against yellowing caused by alkaline oxidation, against light discoloration, against bleeding or running of the dye when moistened, and against feathering or running of subsequently applied ink. It is understood that all of these agents will be thoroughly compatible with each other and with the diazo compound of the present invention and the particular coupling agent employed. These components of the formulation are well known in the art and, in the interest of brevity, will not be described in detail herein because they do not comprise a novel feature of the present invention.

The paper or other material is coated with the formulation in any suitable manner and will depend upon the particular photoprinting process being employed. These photoprinting processes include the dry method, semi-dry method, wet method, solvent coating system, etc. In these methods decomposition and coupling of the diazo compound is effected by light, heat, ammonia and/or other suitable methods. Here again, these methods are well known in the industry and, in the interest of brevity, are not being described in detail in the present application because they do not comprise a novel feature thereof. However, it is understood that the particular formulation will be selected to meet the specific photoprinting process employed.

The order of applying the various ingredients to the paper or other material will depend upon the particular photoprinting process employed. In the dry method, the paper or other material is first coated with the diazo compound, along with other components, as required, and then coated with the coupling agent, along with other components, as desired. In this method, the diazo compound is decomposed during exposure to actinic rays. In the wet method, the diazo compound is first applied to the paper or other material and then is subjected to exposure to the light rays, after which it is passed through a solution of the coupling agent and other materials, to be followed by heating and drying. In the ammonia system, the paper or other material, after exposure, is contacted with ammonia vapors or wet ammonia. The solvent coating system is used particularly for printing on "Mylar" or other suitable plastic material.

It is understood that a mixture or diazo compounds may be used to form reproductions of new or different colors. When desired, a mixture of coupling agents also may be used.

When used in the diazotype photoprinting process, the novel compounds of the present invention possess unexpected advantages over conventional diazo compounds. For example, p - (N - β-cyanoethyl-N-cyclohexylamino)-benzenediazonium chloride zinc chloride salt produces a deep purple image which is of considerable advantage in reproduction processes. Generally a cyanoalkyl radical appears to slow the rate of reproduction. However, it has been found that the sec-alkyl or cycloalkyl radical apparently offsets the decrease in rate caused by the cyanoalkyl radical and results in a final solution which is at least equal in speed of reproduction to those of the prior art. However, because of the intense color obtained with the compound of the present invention, reduction in the quantity of one or more of other components of the solution may be made, thereby resulting in economical advantages. Furthermore, the paper coated with the diazo compound of the present invention has long shelf life and therefore may be stored prior to use without deterioration for a time longer than encountered in normal use.

The following examples are introduced to illustrate further the novelty and utility of the present invention but not with the intention of unduly limiting the same.

Example I

The diazo compound of this example is p-(N-β-cyanoethyl-N - cyclohexylamino) - benzenediazonium chloride zinc chloride salt and was prepared as follows. One mole of N-cyclohexylaniline and 1.2 moles of acrylonitrile were refluxed with 75 g. of acetic acid at a temperature ranging from 103 to 131° C. for a period of about 50 hours. A 48% yield of N-(β-cyanoethyl)-N-cyclohexylaniline was obtained. An aqueous solution of 91 g. (0.4 mole) of the N-(β-cyanoethyl)-N-cyclohexylaniline in 390 ml. of water and 262 ml. of concentrated hydrochloric acid were cooled to 4° C. in an ice bath and a solution of 32.8 g. of sodium nitrite in 106 ml. of water were added gradually during a period of 2 hours. The reaction temperature was kept at 4–6° C. The product was permitted to stand overnight, after which 89 ml. of concentrated hydrochloric acid were added. A total of 70 g. of zinc dust were added in increments, the temperature rising to 40–50° C. The reaction mixture was stirred for an additional one-half hour and yielded a pale amber solution which was filtered. To a portion of the filtrate there were added 18 ml. concentrated hydrochloric acid and 930 ml. of water to make a total volume of about 1500 ml. This then was cooled to 10° C. and a solution of 15 g. of sodium nitrite in 106 ml. of water were added with stirring over a period of an hour, the reaction temperature being kept at 7–10° C. Because there was an excess of nitrous acid, 2.8 g. of urea were added together with 5 g. of charcoal. The mixture was stirred for an additional 45 minutes and then filtered and the filter-cake washed with water. The filtrate was treated with about 300 g. of sodium chloride to salt out the desired complex which was deposited as bright yellow crystalline granules. The purity of the p-(N-cyanoethyl-N-cyclohexylamino)-benzenediazonium chloride zinc chloride salt was determined by subjecting an aqueous solution thereof to ultraviolet light and measuring the nitrogen evolved. The product was found to contain more than 70% by weight of active material.

*Example II*

Example I describes the preparation of p-(N-β-cyanoethyl-N - cyclohexylamino) - benzenediazonium chloride zinc chloride salt. When p-(N-β-cyanoethyl-N-cyclohexyl-amino)-benzenediazonium chloride is desired, the preparation proceeds in the same manner as described in Example I up to and including the addition of zinc dust. The reaction mixture then is alkalinized with 20% sodium hydroxide solution, filtered to remove zinc hydroxide, and the filtrate is extracted with ether, dried over sodium sulfate, distilled under vacuum to evaporate ether and to recover N-(β-cyanoethyl)-N-cyclohexyl-p-phenylenediamine as a crystalline purple solid. Several preparations were made in the above manner and the products were found to be as high as 99% pure as determined by basic nitrogen titration.

The N - (β-cyanoethyl)-N-cyclohexyl-p-phenylenediamine, prepared in the manner described above, is converted to the diazonium chloride by reacting the same with sodium nitrite and hydrochloric acid at a temperature below about 10° C. This forms N-(β-cyanoethyl-N-cyclohexyl)-benzenediazonium chloride which, as hereinbefore set forth, is unstable and therefore is kept at a low temperature.

*Example III*

The compound of this example is p-(N-β-cyanoethyl-N - isopropyl) - benzenediazonium chloride zinc chloride salt and was prepared as follows. A mixture of 135 g. (1 mole) of N-isopropylaniline, 81 g. (1.52 mole) of acrylonitrile and 2.7 g. (0.014 mole) of cupric acetate monohydrate was charged in a glass-lined rotating autoclave under 30 atmospheres initial hydrogen pressure and gradually brought up to a temperature of 100° C. and then the autoclave was rotated at this temperature for 19 hours. Following completion of the reaction, a dark amber liquid product was distilled to produce N-(β-cyanoethyl)-N-isopropylaniline boiling in the range of 110° C.–128° C. at 0.3 mm. and having an index of refraction $n_D^{21}$ of 1.5426. The product was analyzed by nuclear magnetic resonance and infrared spectroscopy and gas-liquid chromatography and found to be of satisfactory purity. Calculated for $C_{12}H_{16}N_2$ are 76.55 carbon and 8.57 hydrogen. Found: 76.74 carbon and 8.77 hydrogen.

The N-(β-cyanoethyl)-N-isopropylaniline, prepared in the above manner, was converted to the corresponding p-phenylenediamine as follows. Nitrosation was effected by reacting 56 g. (0.30 mole) of the N-(β-cyanoethyl)-N-isopropylaniline with sodium nitrite and dilute hydrochloric acid at 2–6° C., following which the reaction mixture was allowed to stand for 16 hours at room temperature. Reduction of the resulting nitro derivative was effected by commingling therewith zinc dust and hydrochloric acid and reacting at 21–45° C., followed by springing with sodium hydroxide, filtering to remove resulting zinc hydroxide, extracting with benzene and distilling the benzene extract. N - (β - cyanoethyl)-N-isopropyl-p-phenylenediamine distilled over chiefly at 150–153° C. at 0.4 mm. and crystallized on standing. An analytical sample was recrystallized from Skellysolve C (heptane) and comprised with white needles having a melting point of 61–62° C. Infrared and nuclear magnetic resonance spectroscopic analyses confirmed the structure of N-(β-cyanoethyl)-N-isopropyl-p-phenylenediamine. Basic nitrogen titration established an equivalent weight of 102 which corresponds to the calculated nitrogen content of 101.7. Calculated for $C_{12}H_{17}N_3$ are 70.91 carbon and 8.43 hydrogen. Found: 70.89 carbon and 8.81 hydrogen.

The N - (β - cyanoethyl) - N-isopropyl-p-phenylenediamine, prepared in the above manner, was converted to p - (N - β - cyanoethyl-N-isopropylamino)-benzenediazonium chloride zinc chloride salt as follows. 42 g. of the N-(β-cyanoethyl)-N-isopropyl-p-phenylenediamine were dissolved in a mixture of 30 g. of zinc chloride, 100 cc. of concentrated HCl, 30 cc. of water and a trace of zinc dust. The resulting mixture was cooled to −5° C. and 14.2 g. of sodium nitrite dissolved in 30 cc. of water were added thereto gradually with stirring and the stirring was continued for 30 minutes. In order to destroy excess sodium nitrite, 1 g. of urea dissolved in water was added. The zinc chloride salt was precipitated by adding 200 g. of a saturated sodium chloride solution and the precipitate was dissolved in acetone and filtered to remove any remaining inorganic salt. The filtrate was distilled to remove acetone and to recover 40.7 g. of p-(N-β-cyanoethyl-N-isopropylamino)-benzenediazonium chloride zinc chloride salt as a yellow amorphous solid.

*Example IV*

The compound of this example is p-(N-cyanomethyl-N-isopropylamino)-benzenediazonium chloride zinc chloride salt and was prepared as follows. A mixture of 135 g. (1 mole) of N-isopropylaniline, 50 g. (0.66 mole) of chloroacetonitrile and 50 cc. of xylene as solvent was refluxed at 132–144° C. for 5 hours. After completion of the reaction, the reaction mixture was alkalinized with 20% sodium hydroxide solution and the resultant upper organic layer was removed, taken up in ether and distilled under reduced pressure. N-(cyanomethyl)-N-isopropylaniline was recovered as a distillate fraction having a boiling point of 103–105° C. at 0.7 mm. The N-(cyanomethyl)-N-isopropylaniline was nitrosated and reduced by reaction with sodium nitrite, HCl and zinc dust at 5–10° C. and subsequently reacted at 40–50° C. p-(N-cyanomethyl-N-isopropylamino)-benzenediazonium chloride zinc chloride salt was recovered from the reaction mixture and its purity was determined by subjecting an aqueous solution thereof to ultraviolet light and measuring the nitrogen evolved.

*Example V*

The compound of this example is p-(N-cyanomethyl-N-sec-butylamino)-benzenediazonium chloride zinc chloride salt. N-(cyanomethyl)-N-sec-butylaniline was first prepared by heating 27 g. of sec-butylaniline and 15 g. of chloroacetonitrile for 12 hours on a steam bath. The reaction mixture then was alkalinized with 20% sodium hydroxide solution, taken up in ether and distilled under reduced pressure. N - (cyanomethyl)-N-sec-butylaniline was recovered as a distillate having a boiling point of 106–108° C. at 0.9 mm. The chemical composition of the product was confirmed by nuclear magnetic resonance spectroscopy. The N-(cyanomethyl)-N-sec-butylaniline then is nitrosated, reduced and diazotized in the same manner as hereinbefore described to produce p-(N-cyanomethyl-N-sec-butylamino) - benzenediazonium chloride zinc chloride salt.

*Example VI*

The compound of this example is p-(N-β-cyanoethyl-N-n-butylamino)-benzenediazonium chloride zinc chloride salt and is prepared in substantially the same manner as heretofore described. N-n-butylaniline is prepared by the reductive alkylation of aniline with butyraldehyde at 160° C. and 100 atmospheres initial hydrogen pressure in the presence of a platinum-alumina catalyst. The N-n-butylaniline then is reacted with acrylonitrile in the presence of acetic acid catalyst at a temperature of about 125° C. The resultant N-(β-cyanoethyl)-N-n-butylaniline is converted to p-(N-β-cyanoethyl-N-n-butyl)-benzenediazonium chloride zinc chloride salt by reaction with hydrochloric acid and sodium nitrite, followed by reaction with zinc chloride in the manner hereinbefore described.

Example VII

The compound of this example is p-(N-β-cyanoethyl-N-β-hydroxyethylamino) - benzenediazonium chloride zinc chloride salt and is prepared by first forming N-(β-cyanoethyl)-aniline and then reacting with ethylene oxide to form N - (β - cyanoethyl)-N-β-hydroxyethylaniline. This then is converted to the corresponding phenylenediamine and diazotized in the manner hereinbefore described to form p-(N - β - cyanoethyl-N-β-hydroxyethylamino)-benzenediazonium chloride zinc chloride salt which is recovered as a dark semi-solid product.

Example VIII p-(N,N-di-β-cyanoethylamino)-benzenediazonium chloride zinc chloride salt is formed by first reacting aniline with acrylontrile in a mole proportion of 1:7. The resultant N,N-di-(β-cyanoethyl)-aniline then is nitrosated, reduced and diazotized in the manner hereinbefore described to form p-(N,N-di-β-cyanoethylamino)-benzenediazonium chloride zinc chloride salt.

Example IX

The compound of this example is p-(N-β-cyanoethyl-N-cyclohexylamino)-benzenediazonium chloride cadmium chloride salt and is prepared in substantially the same manner as described in Example I, except that cadmium is used as the reducing agent and cadmium chloride is added at a later stage in the preparation.

Example X

The compound of this example is p-(N-β-cyano-ethyl-N-isopropylamino)-benzenediazonium sulfate cadmium sulfate salt and is prepared in substantially the same manner as described in Example III, except that the N-(β-cyanoethyl)-N-isopropylaniline is reacted with sodium nitrite and dilute sulfuric acid, then reduced with cadmium and sulfuric acid and finally converted to the salt by reacting with cadmium sulfate and sulfuric acid. The p-(N-β-cyanoethyl-N-isopropylamino) - benzenediazonium sulfate salt is recovered from the reaction product in substantially the same manner as hereinbefore described.

Example XI

As hereinbefore set forth, one important utility for the diazo compounds of the present invention is for use in the diazotype photoprinting process. A number of the diazo compounds of the present invention were evaluated for this use. The formulation used in these runs was of the following recipe:

TABLE I

| | |
|---|---|
| Water _____cc__ | 100 |
| Urea _____g__ | 20 |
| Malonic acid _____g__ | 1 |
| Coupling agent [1] _____percent by wt.__ | 2 |
| Diazo compound _____do__ | 2 |

[1] 2,3-dihydroxy-6-naphthalene sulfonic acid sodium salt.

Each of the formulations was used to separately coat separate sheets of paper. The coated papers then were used in a photoprinting process of the dry method in which the sheets of paper each were placed in contact with an original document containing printing and then were exposed to actinic light and subsequently heated at about 232° C. The exposure times required to obtain identical prints were measured and reported in seconds. For compartive purposes, a formulation was prepared to contain p-morpholinobenzenediazonium chloride zinc chloride salt as representative of a conventional prior art diazo compound. The time required when using the morpholino derivative was assigned an arbitrary value of 1, and the times required using the other diazo compounds to obtain identical prints were then calculated as a ratio thereto. This, then, describes the speed of the printing when using the different diazo compounds.

The diazo compound used in this example was p-(N-β-cyanoethyl - N - cyclohexylamino)-benzenediazonium chloride zinc chloride salt, prepared as described in Example I. When evaluated in the manner described above, the solution containing this diazo compound had a ratio speed of 1. This is surprising because, as hereinbefore set forth, the inclusion of a cyanoalkyl group normally appears to decrease the speed of reproduction. Of greater importance, however, is the fact that the reproduction had a deep purple color which, as hereinbefore set forth, offers numerous advantages including (1) the production of copies having an intense color which is not obtainable by competitive diazonium compounds, (2) reduction in one or more of the other components of the solution, thereby resulting in lower cost and (3) use of a smaller amount of the diazo compound than is required with competitive diazo compounds.

Example XII

Also evaluated in the same manner as described in Example XI is p-(N-β-cyanoethyl-N-isopropyl)-benzenediazonium chloride zinc chloride salt, prepared as described in Example III. Here again, the reproduction was of intense color and thereby offers the advantages as set forth in Example XI.

I claim as my invention:

1. A compound of the following formula

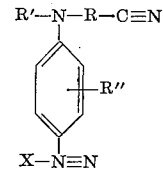

where R is an alkylene radical containing from 1 to 10 carbon atoms, R' is selected from the group consisting of hydrogen, alkyl of from 1 to 20 carbon atoms, cycloalkyl of from 4 to 20 carbon atoms and hydroxyalkyl of from 1 to 20 carbon atoms, R'' is selected from the group consisting of hydrogen, hydroxy, alkoxy of from 1 to 10 carbon atoms and alkyl of from 1 to 12 carbon atoms, and X is selected from the group consisting of halogen, sulfate, phosphate and fluoborate.

2. p-(N-cyanoalkyl - N - hydrocarbylamino)-benzenediazonium halide in which the alkyl contains from 1 to 10 carbon atoms and the hydrocarbyl is alkyl of from 1 to 20 carbon atoms or cycloalkyl of from 4 to 20 carbon atoms.

3. p-(N-cyanoalkyl - N - hydrocarbylamino)-benzenediazonium halide metal halide salt in which the alkyl contains from 1 to 10 carbon atoms, the hydrocarbyl is alkyl of from 1 to 20 carbon atoms or cycloalkyl of from 4 to 20 carbon atoms, and the metal is zinc, cadmium or tin.

4. p-(N-β-cyanoethyl - N - isopropylamino)-benzenediazonium chloride zinc chloride salt.

5. p-(N - β - cyanoethyl-N-sec-butylamino)-benzenediazonium chloride zinc chloride salt.

6. p-(N-β-cyanoethyl - N - cyclohexylamino) - benzenediazonium chloride zinc chloride salt.

7. p-(N-β-cyanoethyl - N - hydroxyalkylamino)-benzenediazonium chloride zinc chloride salt in which the alkyl contains from 1 to 10 carbon atoms.

8. p-(N-β-cyanoethyl - N - β - hydroxyethylamino)-benzenediazonium chloride zinc chloride salt.

9. p-(N,N - di - cyanoalkylamino)-benzenediazonium halide metal halide salt in which the alkyl contains from 1 to 10 carbon atoms and the metal is zinc, cadmium or tin.

10. p-(N,N-di-β-cyanoethylamino)-benzenediazonium chloride zinc chloride salt.

References Cited by the Examiner
UNITED STATES PATENTS

| | | |
|---|---|---|
| 2,092,359 | 9/1937 | Schnitzpahn et al. ____ 260—142 |
| 2,336,309 | 12/1943 | Snell et al. |
| 2,593,114 | 4/1952 | Danek et al. ____ 260—142 XR |
| 2,633,461 | 3/1953 | Seidenfaden et al. ___ 260—142 |
| 2,680,074 | 6/1954 | Sus _____ 260—141 XR |
| 2,683,708 | 7/1954 | Dickey et al. ____ 260—141 XR |
| 2,694,010 | 11/1954 | Botkin et al. |
| 2,707,181 | 4/1955 | Stanley et al. _____ 260—142 |
| 2,708,671 | 5/1955 | Towne et al. ____ 260—141 XR |
| 2,840,472 | 6/1958 | Sus et al. _____ 96—75 |
| 3,166,422 | 1/1965 | McKinney et al. _____ 96—75 |

CHARLES B. PARKER, *Primary Examiner.*

FLOYD D. HIGEL, *Assistant Examiner.*